US011176214B2

(12) United States Patent
Sripada et al.

(10) Patent No.: US 11,176,214 B2
(45) Date of Patent: Nov. 16, 2021

(54) METHOD AND APPARATUS FOR SPATIAL DESCRIPTIONS IN AN OUTPUT TEXT (71) Applicant: ARRIA DATA2TEXT LIMITED, Aberdeen (GB)

(72) Inventors: Gowri Somayajulu Sripada, Westhill (GB); Neil Burnett, Inverurie (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 393 days.

(21) Appl. No.: 14/702,341

(22) Filed: May 1, 2015

(65) Prior Publication Data
US 2015/0324374 A1 Nov. 12, 2015

Related U.S. Application Data (63) Continuation of application No. PCT/IB2012/056513, filed on Nov. 16, 2012.

(51) Int. Cl.
G06F 16/9537 (2019.01)
G06F 16/33 (2019.01)
(Continued)

(52) U.S. Cl.
CPC .... *G06F 16/9537* (2019.01); *G06F 16/24578* (2019.01); *G06F 16/3334* (2019.01); *G06F 40/40* (2020.01); *G06Q 10/06* (2013.01)

(58) Field of Classification Search
CPC ... G10L 15/18; G10L 15/1822; G10L 15/197; G10L 2025/783; G06F 17/274;
(Continued)

(56) References Cited

U.S. PATENT DOCUMENTS 5,181,250 A    1/1993  Morgan et al.
5,237,502 A    8/1993  White et al.
(Continued)

FOREIGN PATENT DOCUMENTS

AU    2011247830 B2    12/2011
AU    2011253627 B2    12/2011
(Continued)

OTHER PUBLICATIONS

International Search Report and Written Opinion for Application No. PCT/IB2012/056513 dated Jun. 26, 2013.
(Continued)

*Primary Examiner* — Vaishali Shah
(74) *Attorney, Agent, or Firm* — Alston & Bird LLP (57) ABSTRACT Methods, apparatuses, and computer program products are described herein that are configured to express a linguistic description of set of points within a spatial area in an output text. In some example embodiments, a method is provided that comprises generating one or more descriptors and/or one or more combinations of descriptors that are configured to linguistically describe at least a portion of a set of points within a spatial area. The method of this embodiment may also include scoring each of the one or more descriptors and/or one or more combinations of the one or more descriptors. The method of this embodiment may also include selecting a descriptor or combination of descriptors that has the highest score when compared to other descriptors or combination of descriptors, providing the descriptor or combination of descriptors satisfies a threshold.

29 Claims, 4 Drawing Sheets (51) Int. Cl.
*G06F 16/2457* (2019.01)
*G06Q 10/06* (2012.01)
*G06F 40/40* (2020.01)

(58) Field of Classification Search
CPC ......... G06F 17/30401; G06F 17/30684; G06F 17/2881; G06F 16/9537; G06F 16/3334; G06F 16/24578
See application file for complete search history.

(56) References Cited

U.S. PATENT DOCUMENTS

| | | | |
|---|---|---|---|
| 5,311,429 A | | 5/1994 | Tominaga |
| 5,321,608 A | | 6/1994 | Namba et al. |
| 5,629,687 A | | 5/1997 | Sutton et al. |
| 5,794,177 A | | 8/1998 | Carus et al. |
| 5,802,488 A | | 9/1998 | Edatsune |
| 5,937,385 A | * | 8/1999 | Zadrozny ............. G10L 15/193 704/251 |
| 6,023,669 A | | 2/2000 | Suda et al. |
| 6,078,914 A | | 6/2000 | Redfern |
| 6,138,087 A | | 10/2000 | Budzinski |
| 6,266,617 B1 | | 7/2001 | Evans |
| 6,442,485 B2 | | 8/2002 | Evans |
| 6,466,899 B1 | | 10/2002 | Yano et al. |
| 6,665,640 B1 | | 12/2003 | Bennett et al. |
| 6,717,513 B1 | | 4/2004 | Sandelman et al. |
| 6,947,885 B2 | | 9/2005 | Bangalore et al. |
| 7,043,420 B2 | | 5/2006 | Ratnaparkhi |
| 7,167,824 B2 | | 1/2007 | Kallulli |
| 7,231,341 B2 | | 6/2007 | Bangalore et al. |
| 7,238,313 B2 | | 7/2007 | Ferencz et al. |
| 7,305,336 B2 | | 12/2007 | Polanyi et al. |
| 7,310,969 B2 | | 12/2007 | Dale |
| 7,346,493 B2 | | 3/2008 | Ringger et al. |
| 7,418,447 B2 | | 8/2008 | Caldwell et al. |
| 7,424,363 B2 | | 9/2008 | Cheng et al. |
| 7,444,287 B2 | | 10/2008 | Claudatos et al. |
| 7,496,621 B2 | | 2/2009 | Pan et al. |
| 7,526,424 B2 | | 4/2009 | Corston-Oliver et al. |
| 7,533,089 B2 | | 5/2009 | Pan et al. |
| 7,562,005 B1 | | 7/2009 | Bangalore et al. |
| 7,684,991 B2 | | 3/2010 | Stohr et al. |
| 7,693,813 B1 | * | 4/2010 | Cao ................... G06F 17/30616 707/999.001 |
| 7,711,581 B2 | | 5/2010 | Hood et al. |
| 7,783,486 B2 | | 8/2010 | Rosser et al. |
| 7,809,552 B2 | | 10/2010 | Pan et al. |
| 7,849,048 B2 | | 12/2010 | Langseth et al. |
| 7,849,049 B2 | | 12/2010 | Langseth et al. |
| 7,856,390 B2 | | 12/2010 | Schiller |
| 7,873,509 B1 | | 1/2011 | Budzinski |
| 7,921,091 B2 | | 4/2011 | Cox et al. |
| 7,930,169 B2 | | 4/2011 | Billerey-Mosier |
| 7,933,774 B1 | | 4/2011 | Begeja et al. |
| 7,966,172 B2 | | 6/2011 | Ruiz et al. |
| 7,970,601 B2 | | 6/2011 | Burmester et al. |
| 7,979,267 B2 | | 7/2011 | Ruiz et al. |
| 8,019,610 B2 | | 9/2011 | Walker et al. |
| 8,024,331 B2 | | 9/2011 | Calistri-Yeh et al. |
| 8,037,000 B2 | | 10/2011 | Delmonico et al. |
| 8,082,144 B1 | | 12/2011 | Brown et al. |
| 8,090,727 B2 | | 1/2012 | Lachtarnik et al. |
| 8,150,676 B1 | | 4/2012 | Kaeser |
| 8,175,873 B2 | | 5/2012 | Di Fabbrizio et al. |
| 8,180,647 B2 | | 5/2012 | Walker et al. |
| 8,180,758 B1 | | 5/2012 | Cornali |
| 8,229,937 B2 | | 7/2012 | Kiefer et al. |
| 8,355,903 B1 | | 1/2013 | Birnbaum et al. |
| 8,374,848 B1 | | 2/2013 | Birnbaum et al. |
| 8,425,325 B2 | | 4/2013 | Hope |
| 8,473,911 B1 | | 6/2013 | Baxter |
| 8,494,944 B2 | | 7/2013 | Schiller |
| 8,515,733 B2 | | 8/2013 | Jansen |
| 8,515,737 B2 | | 8/2013 | Allen |
| 8,548,814 B2 | | 10/2013 | Manuel-Devadoss |
| 8,548,915 B2 | | 10/2013 | Antebi et al. |
| 8,561,014 B2 | | 10/2013 | Mengusoglu et al. |
| 8,566,090 B2 | | 10/2013 | Di Fabbrizio et al. |
| 8,589,148 B2 | | 11/2013 | Atallah et al. |
| 8,589,172 B2 | | 11/2013 | Alonso et al. |
| 8,616,896 B2 | | 12/2013 | Lennox |
| 8,620,669 B2 | | 12/2013 | Walker et al. |
| 8,626,613 B2 | | 1/2014 | Dale et al. |
| 8,630,844 B1 | | 1/2014 | Nichols et al. |
| 8,655,889 B2 | | 2/2014 | Hua et al. |
| 8,676,691 B2 | | 3/2014 | Schiller |
| 8,688,434 B1 | | 4/2014 | Birnbaum et al. |
| 8,700,396 B1 | | 4/2014 | Mengibar et al. |
| 8,738,384 B1 | | 5/2014 | Bansal et al. |
| 8,738,558 B2 | | 5/2014 | Antebi et al. |
| 8,762,134 B2 | | 5/2014 | Reiter |
| 8,762,133 B2 | | 6/2014 | Reiter |
| 8,775,161 B1 | | 7/2014 | Nichols et al. |
| 8,825,533 B2 | | 9/2014 | Basson et al. |
| 8,843,363 B2 | | 9/2014 | Birnbaum et al. |
| 8,849,670 B2 | | 9/2014 | Di Cristo et al. |
| 8,886,520 B1 | | 11/2014 | Nichols et al. |
| 8,892,417 B1 | | 11/2014 | Nichols et al. |
| 8,892,419 B2 | | 11/2014 | Lundberg et al. |
| 8,898,063 B1 | | 11/2014 | Sykes et al. |
| 8,903,711 B2 | | 12/2014 | Lundberg et al. |
| 8,903,718 B2 | | 12/2014 | Akuwudike |
| 8,909,595 B2 | | 12/2014 | Gandy et al. |
| 8,914,452 B2 | | 12/2014 | Boston et al. |
| 8,924,330 B2 | | 12/2014 | Antebi et al. |
| 8,930,305 B2 | | 1/2015 | Namburu et al. |
| 8,977,953 B1 | | 3/2015 | Pierre et al. |
| 8,984,051 B2 | | 3/2015 | Olsen et al. |
| 9,002,695 B2 | | 4/2015 | Watanabe et al. |
| 9,002,869 B2 | | 4/2015 | Riezler et al. |
| 9,015,730 B1 | | 4/2015 | Allen et al. |
| 9,028,260 B2 | | 5/2015 | Nanjiani et al. |
| 9,092,276 B2 | | 7/2015 | Allen et al. |
| 9,104,720 B2 | | 8/2015 | Rakshit et al. |
| 9,110,882 B2 | | 8/2015 | Overell et al. |
| 9,110,977 B1 | | 8/2015 | Pierre et al. |
| 9,111,534 B1 | | 8/2015 | Sylvester et al. |
| 9,135,244 B2 | | 9/2015 | Reiter |
| 9,135,662 B2 | | 9/2015 | Evenhouse et al. |
| 9,146,904 B2 | | 9/2015 | Allen |
| 9,164,982 B1 | | 10/2015 | Kaeser |
| 9,190,054 B1 | | 11/2015 | Riley et al. |
| 9,208,147 B1 | | 12/2015 | Nichols et al. |
| 9,229,927 B2 | | 1/2016 | Wolfram et al. |
| 9,240,197 B2 | | 1/2016 | Begeja et al. |
| 9,244,894 B1 | | 1/2016 | Dale et al. |
| 9,251,134 B2 | | 2/2016 | Birnbaum et al. |
| 9,251,143 B2 | | 2/2016 | Bird et al. |
| 9,263,039 B2 | | 2/2016 | Di Cristo et al. |
| 9,268,770 B1 | | 2/2016 | Kursun |
| 9,323,743 B2 | | 4/2016 | Reiter |
| 9,405,448 B2 | | 8/2016 | Reiter |
| 9,640,045 B2 | | 5/2017 | Reiter |
| 10,026,274 B2 | | 7/2018 | Reiter |
| 2002/0026306 A1 | | 2/2002 | Bangalore et al. |
| 2003/0126181 A1 | * | 7/2003 | Young ................... G06Q 10/10 718/100 |
| 2003/0131315 A1 | | 7/2003 | Escher |
| 2003/0212545 A1 | | 11/2003 | Kallulli |
| 2004/0246120 A1 | | 12/2004 | Benner et al. |
| 2005/0039107 A1 | | 2/2005 | Hander et al. |
| 2005/0022863 A1 | | 10/2005 | Araki et al. |
| 2005/0256703 A1 | | 11/2005 | Markel |
| 2006/0085667 A1 | | 4/2006 | Kubota et al. |
| 2006/0172276 A1 | * | 8/2006 | Higgins ................... G09B 7/02 434/362 |
| 2006/0178868 A1 | * | 8/2006 | Billerey-Mosier ........................ G06F 17/2881 704/9 |
| 2006/0259293 A1 | | 11/2006 | Orwant |
| 2007/0078655 A1 | | 4/2007 | Semkow et al. |
| 2007/0106628 A1 | | 5/2007 | Adjali et al. |
| 2007/0129942 A1 | | 6/2007 | Ban et al. |

(56) References Cited

U.S. PATENT DOCUMENTS

| | | |
|---|---|---|
| 2007/0143099 A1 | 6/2007 | Balchandran et al. |
| 2007/0223699 A1* | 9/2007 | Jones .............. G06F 16/2477 |
| | | 380/262 |
| 2008/0126160 A1* | 5/2008 | Takuechi .......... G06Q 10/0639 |
| | | 705/7.38 |
| 2008/0221865 A1 | 9/2008 | Wellmann |
| 2008/0221870 A1 | 9/2008 | Attardi et al. |
| 2008/0281781 A1 | 11/2008 | Zhao et al. |
| 2008/0312954 A1 | 12/2008 | Ullrich et al. |
| 2009/0089100 A1 | 4/2009 | Nenov et al. |
| 2009/0089126 A1 | 4/2009 | Odubiyi |
| 2009/0111486 A1 | 4/2009 | Burstrom |
| 2009/0156229 A1 | 6/2009 | Hein et al. |
| 2009/0198496 A1 | 8/2009 | Denecke |
| 2009/0281839 A1 | 11/2009 | Lynn et al. |
| 2009/0286514 A1 | 11/2009 | Lichorowic et al. |
| 2009/0287567 A1 | 11/2009 | Penberthy et al. |
| 2010/0070448 A1* | 3/2010 | Omoigui ............ H01L 27/1463 |
| | | 706/47 |
| 2010/0146491 A1 | 6/2010 | Hirano et al. |
| 2010/0153095 A1 | 6/2010 | Yang et al. |
| 2010/0174545 A1 | 7/2010 | Otani |
| 2010/0191658 A1 | 7/2010 | Kannan et al. |
| 2010/0203970 A1 | 8/2010 | Hope |
| 2010/0332235 A1 | 12/2010 | David |
| 2011/0010164 A1 | 1/2011 | Williams |
| 2011/0068929 A1 | 3/2011 | Franz et al. |
| 2011/0087486 A1 | 4/2011 | Schiller |
| 2011/0160986 A1 | 6/2011 | Wu et al. |
| 2011/0179006 A1 | 7/2011 | Cox et al. |
| 2011/0218822 A1 | 9/2011 | Buisman et al. |
| 2011/0225185 A1 | 9/2011 | Gupta |
| 2011/0257839 A1 | 10/2011 | Mukherjee |
| 2011/0295823 A1* | 12/2011 | Sathish ............. G06F 17/30294 |
| | | 707/705 |
| 2012/0078888 A1 | 3/2012 | Brown et al. |
| 2012/0084027 A1 | 4/2012 | Caine |
| 2012/0136649 A1 | 5/2012 | Freising et al. |
| 2012/0158089 A1 | 6/2012 | Bocek et al. |
| 2012/0173475 A1 | 7/2012 | Ash et al. |
| 2012/0203708 A1* | 8/2012 | Psota .................... G06Q 30/02 |
| | | 705/347 |
| 2012/0290289 A1 | 11/2012 | Manera et al. |
| 2012/0310990 A1 | 12/2012 | Viegas et al. |
| 2013/0030810 A1 | 1/2013 | Kopparapu et al. |
| 2013/0066873 A1 | 3/2013 | Salvetti et al. |
| 2013/0076784 A1* | 3/2013 | Maurer ................ G01C 21/367 |
| | | 345/629 |
| 2013/0144606 A1 | 6/2013 | Birnbaum et al. |
| 2013/0145242 A1 | 6/2013 | Birnbaum et al. |
| 2013/0151238 A1 | 6/2013 | Beaurpere et al. |
| 2013/0174026 A1 | 7/2013 | Locke |
| 2013/0185050 A1 | 7/2013 | Bird et al. |
| 2013/0211855 A1 | 8/2013 | Eberle et al. |
| 2013/0238329 A1 | 9/2013 | Casella dos Santos |
| 2013/0238330 A1 | 9/2013 | Casella dos Santos |
| 2013/0238987 A1 | 9/2013 | Lutwyche |
| 2013/0251233 A1 | 9/2013 | Yang et al. |
| 2013/0259374 A1* | 10/2013 | He ......................... G06T 7/143 |
| | | 382/173 |
| 2013/0268263 A1 | 10/2013 | Park et al. |
| 2013/0293363 A1 | 11/2013 | Plymouth et al. |
| 2013/0311201 A1 | 11/2013 | Chatfield et al. |
| 2014/0019531 A1 | 1/2014 | Czajka et al. |
| 2014/0025371 A1 | 1/2014 | Min |
| 2014/0039878 A1 | 2/2014 | Wasson |
| 2014/0052696 A1 | 2/2014 | Soroushian |
| 2014/0062712 A1 | 3/2014 | Reiter |
| 2014/0067377 A1 | 3/2014 | Reiter |
| 2014/0072947 A1 | 3/2014 | Boguraev et al. |
| 2014/0072948 A1 | 3/2014 | Boguraev et al. |
| 2014/0089212 A1 | 3/2014 | Sbodio |
| 2014/0100846 A1 | 4/2014 | Haine et al. |
| 2014/0100901 A1 | 4/2014 | Haine et al. |
| 2014/0100923 A1 | 4/2014 | Strezo et al. |
| 2014/0125660 A1* | 5/2014 | Redmann .................. G06T 3/40 |
| | | 345/419 |
| 2014/0143720 A1 | 5/2014 | Dimarco et al. |
| 2014/0149107 A1 | 5/2014 | Schilder |
| 2014/0164303 A1 | 6/2014 | Bagchi et al. |
| 2014/0164304 A1 | 6/2014 | Bagchi et al. |
| 2014/0188477 A1 | 7/2014 | Zhang |
| 2014/0278358 A1 | 9/2014 | Byron et al. |
| 2014/0281935 A1 | 9/2014 | Byron et al. |
| 2014/0281951 A1 | 9/2014 | Megiddo et al. |
| 2014/0297268 A1 | 10/2014 | Govrin et al. |
| 2014/0316768 A1 | 10/2014 | Khandekar |
| 2014/0375466 A1 | 12/2014 | Reiter |
| 2014/0379322 A1 | 12/2014 | Koutrika et al. |
| 2014/0379378 A1 | 12/2014 | Cohen-Solal et al. |
| 2015/0006437 A1 | 1/2015 | Byron et al. |
| 2015/0032443 A1 | 1/2015 | Karov et al. |
| 2015/0081299 A1 | 3/2015 | Jasinschi et al. |
| 2015/0081307 A1 | 3/2015 | Cederstrom et al. |
| 2015/0081321 A1 | 3/2015 | Jain |
| 2015/0095015 A1 | 4/2015 | Lani et al. |
| 2015/0106307 A1 | 4/2015 | Antebi et al. |
| 2015/0142418 A1 | 5/2015 | Byron et al. |
| 2015/0142421 A1 | 5/2015 | Buurman et al. |
| 2015/0154359 A1 | 6/2015 | Harris et al. |
| 2015/0163358 A1 | 6/2015 | Klemm et al. |
| 2015/0169522 A1 | 6/2015 | Logan et al. |
| 2015/0169548 A1 | 6/2015 | Reiter |
| 2015/0169659 A1 | 6/2015 | Lee et al. |
| 2015/0169720 A1 | 6/2015 | Byron et al. |
| 2015/0169737 A1 | 6/2015 | Bryon et al. |
| 2015/0179082 A1 | 6/2015 | Byron et al. |
| 2015/0002423 A1 | 8/2015 | Reiter |
| 2015/0227508 A1 | 8/2015 | Howald et al. |
| 2015/0261744 A1 | 9/2015 | Suenbuel et al. |
| 2015/0261836 A1 | 9/2015 | Madhani et al. |
| 2015/0279348 A1 | 10/2015 | Cao et al. |
| 2015/0310013 A1 | 10/2015 | Allen et al. |
| 2015/0310112 A1 | 10/2015 | Allen et al. |
| 2015/0310861 A1 | 10/2015 | Waltermann et al. |
| 2015/0324343 A1 | 11/2015 | Carter et al. |
| 2015/0324347 A1 | 11/2015 | Bradshaw et al. |
| 2015/0324351 A1 | 11/2015 | Sripada et al. |
| 2015/0324413 A1 | 11/2015 | Gubin et al. |
| 2015/0325000 A1 | 11/2015 | Sripada |
| 2015/0326622 A1 | 11/2015 | Carter et al. |
| 2015/0331845 A1 | 11/2015 | Guggilla et al. |
| 2015/0331846 A1 | 11/2015 | Guggilla et al. |
| 2015/0332670 A1 | 11/2015 | Akbacak et al. |
| 2015/0347400 A1 | 12/2015 | Sripada |
| 2015/0356127 A1 | 12/2015 | Pierre et al. |
| 2015/0363363 A1 | 12/2015 | Bohra et al. |
| 2015/0363364 A1 | 12/2015 | Sripada |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2016/0019200 A1 | 1/2016 | Allen |
| 2016/0027125 A1 | 1/2016 | Bryce |
| 2016/0055150 A1 | 2/2016 | Bird et al. |
| 2016/0132489 A1 | 5/2016 | Reiter |
| 2016/0140090 A1 | 5/2016 | Dale et al. |
| 2016/0328385 A1 | 11/2016 | Reiter |
| 2017/0018107 A1 | 1/2017 | Reiter |
| 2019/0035232 A1 | 1/2019 | Reiter |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1 336 955 B1 | 5/2006 |
| EP | 2707809 A1 | 3/2014 |
| EP | 2750759 A1 | 7/2014 |

(56) References Cited

FOREIGN PATENT DOCUMENTS

| | | |
|---|---|---|
| EP | 2849103 A2 | 3/2015 |
| GB | 2518192 A | 3/2015 |
| JP | 61-221873 A | 10/1986 |
| JP | 2004-21791 A | 1/2004 |
| JP | 2014165766 A | 9/2014 |
| WO | WO-2000/074394 A2 | 12/2000 |
| WO | WO-2002/031628 A2 | 4/2002 |
| WO | WO-2002/073449 A1 | 9/2002 |
| WO | WO-2002/073531 A1 | 9/2002 |
| WO | WO-2002/031628 A3 | 10/2002 |
| WO | WO 2006/010044 A2 | 1/2006 |
| WO | WO-2007/041221 A1 | 4/2007 |
| WO | WO-2009/014465 A2 | 1/2009 |
| WO | WO-2010/049925 A2 | 5/2010 |
| WO | WO-2010/051404 A1 | 5/2010 |
| WO | WO-2012/071571 A2 | 5/2012 |
| WO | WO 2013/009613 A1 | 1/2013 |
| WO | WO-2013/042115 A2 | 3/2013 |
| WO | WO-2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/159133 A1 | 10/2015 |
| WO | WO 2015/164253 A1 | 10/2015 |
| WO | WO 2015/175338 A1 | 11/2015 |
| WO | WO 2016/004266 A2 | 1/2016 |

OTHER PUBLICATIONS

Reiter, E. et al., *Building Natural Language Generation Systems*, Cambridge University Press (2000), 138 pages.
International Search Report and Written Opinion for Application No. PCT/IB2012/056514 dated Jun. 26, 2013.
International Search Report and Written Opinion for Application No. PCT/IB2012/057773 dated Jul. 1, 2013
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
International Search Report for Application No. PCT/IB2013/058131 dated Jul. 3, 2014.
Alawneh, A. L. et al., *Pattern Recognition Techniques Applied to the Abstraction of Traces of Inter-Process Communication*, Software Maintenance and Reengineering (CSMR), 2011 15th European Conference on Year: 2011, IEEE Conference Publications (2011) pp. 211-220.
Andre, E. et al., *From Visual Data to Multimedia Presentations*, Grounding Representations: Integration of Sensory Information in Natural Language Processing, Artificial Intelligence and Neural networks, IEE Colloquium on (May 15, 1995) pp. 1-3.
Andre, E. et al., *Natural Language Access to Visual Data: Dealing with Space and Movement*, Report 63, German Research Center for Artificial Intelligence (DFKI) SFB 314, Project VITRA, (Nov. 1989) 1-21.
Barzilay, R., et al.; "*Aggregation via Set Partitioning for Natural Language Generation*" Proceedings of the Human Language Technology Conference of the North American Chapter of the ACL; pp. 359-366; dated Jun. 2006.
Bhoedjang, R. A. F. et al., *Optimizing Distributed Data Structures Using Application-Specific Network Interface Software*, Parallel Processing, 1998, Proceedings; 1998 International Conference on Year: 1998, IEEE Conference Publications (1998) pp. 485-492.
Cappozzo, A. et al., *Surface-Marker Cluster Design Criteria for 3-D Bone Movement Reconstruction*, IEEE Transactions on Biomedical Engineering, vol. 44, No. 12 (Dec. 1997) 1165-1174.
Dragon, R. et al., *Multi-Scale Clustering of Frame-to-Frame Correspondences for Motion Segmentation*, Computer Vision ECCV 2012, Springer Berlin Heidelberg (Oct. 7, 2012) 445-458.
Gatt, A. et al., *From Data to Text in the Neonatal Intensive Care Unit: Using NLG Technology for Decision Support and Information Management*, AI Communication (Jan. 1, 2009) 153-186.
Gorelov, S. s. et al., *Search Optimization in Semistructured Databases Using Hierarchy of Document Schemas*, Programming and Computer Software, vol. 31, No. 6 (2005) 321-331.
Hercules, D., et al.; "*Assresation in Natural Language Generation*," Trends in Natural Language Generation, an Artificial Intelligence Perspective; pp. 88-105; dated Apr. 1993.
Herzog, G. et al., *Combining Alternatives in the Multimedia Presentation of Decision Support Information for Real-Time Control*, IFIP (1998) 15 pages.
Kottke, D. P. et al., *Motion Estimation Via Cluster Matching*, 8180 IEEE Transactions on Pattern Analysis and Machine Intelligence 16, No. 11 (Nov. 1994) 1128-1132.
Leonov, A. v. et al., *Construction of an Optimal Relational Schema for Storing XML Documents in an RDBMS Without Using DTD/XML Schema*, Programming and Computer Software, vol. 30, No. 6 (2004) 323-336.
Perry, B. et al., *Automatic Realignment of Data Structures to Improve MPI Performance*, Networks (ICN), 2010 Ninth International Conference on Year: 2010, IEEE Conference Publications (2010) pp. 42-47.
Quinlan, J. R., *Induction of Decision Trees*, Machine Learning, Kluwer Academic Publishers, vol. 1, No. 1 (Jan. 1, 1986) 81-106.
Radev, D. R. et al., *Generating Natural Language Summaries from Multiple On-Line Sources*, Association of Computational Linguistics, vol. 24, No. 3 (1998) 469-500.
Reiter, E., *An Architecture for Data-to-Text Systems*, Proceedings of ENLG-2007 (Jun. 20, 2007) 97-104.
Reiter, E. et al. *Building Applied Natural Language Generation Systems*, Natural Language Engineering 1 (1) (1995) 31 pages.
Shaw, J.; "*Clause Aggregation Using Linguistic Knowledge*;" Proceedings of IWNLG; pp. 138-147; dated Jan. 1998; retrieved from <http://acl.ldc.upenn.edu/W/W98/W98-1415.pdf>.
Spillner, J. et al., *Algorithms for Dispersed Processing*, Utility and Cloud Computing (UC), 204 IEEE/ACM 7th International Conference on Year: 2014, IEEE Conferenced Publications (2014) pp. 914-921.
Voelz, D. et al., *Rocco: A RoboCup Soccer Commentator System*, German Research Center for Artificial Intelligence DFKI GmbH (1999) 11 pages.
Yu, J. et al., *Choosing the Content of Textual Summaries of Large Time-Series Data Sets*, Natural Language Engineering 13, (Jan. 1, 2007) pp. 1-28.
Statement in accordance with the Notice from the European patent Office dated Oct. 1, 2007 concerning business methods (OJ EPO Nov. 2007, 592-593, (XP002456414) 1 page.
Office Action for U.S. Appl. No. 14/023,023 dated Mar. 4, 2014.
Notice of Allowance for U.S. Appl. No. 14/023,023 dated Apr. 11, 2014.
Office Action for U.S. Appl. No. 14/023,056 dated Nov. 21, 2013.
Notice of Allowance for U.S. Appl. No. 14/023,056 dated Apr. 29, 2014.
U.S. Appl. No. 12/779,636; entitled "System and Method for Using Data to Automatically Generate A Narrative Story".
U.S. Appl. No. 13/186,308; entitled "Method and Apparatus for Triggering The Automatic Generation of Narratives".

(56) References Cited

OTHER PUBLICATIONS

U.S. Appl. No. 13/186,329; entitled "Method and Apparatus for Triggering The Automatic Generation of Narratives".
U.S. Appl. No. 13/186,337; entitled "Method and Apparatus for Triggering The Automatic Generation of Narratives".
U.S. Appl. No. 13/186,346; entitled "Method and Apparatus for Triggering The Automatic Generation of Narratives".
U.S. Appl. No. 13/464,635; entitled "Use of Tools and Abstraction in a Configurable and Portable System for Generating Narratives".
U.S. Appl. No. 13/464,675; entitled "Configurable and Portable for Generating Narratives".
U.S. Appl. No. 13/464,716; entitled "Configurable and Portable for Generating Narratives".
U.S. Appl. No. 14/023,023; entitled "Method and Apparatus for Alert on;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684, filed Sep. 16, 2013; In re: Sripad et al., entitled *Method, Apparatus, and Computer Program Product for User-Directed Reporting*.
U.S. Appl. No. 14/027,775; entitled "Method and Apparatus for Interactive Reports", filed Sep. 16, 2013.
Kukich, K., *Knowledge-Based Report Generation: A Knowledge-Engineering Approach to Natural Language Report Generation*, Dissertation to The Interdisciplinary Department of Information Science, University of Pittsburg (Aug. 1983) 260 pages.
U.S. Appl. No. 14/914,461, filed Feb. 25, 2016; In re: Reiter et al., entitled *Text Generation From Correlated Alerts*.
U.S. Appl. No. 15/022,420, filed Mar. 16, 2016; In re: Mahamood, entitlted *Method and Apparatus for Document Planning*.
U.S. Appl. No. 15/074,425, filed Mar. 18, 2016; In re: Reiter, entitled *Method and Apparatus for Situational Analysis Text Generation*.
U.S. Appl. No. 15/093,337, filed Apr. 7, 2016; In re: Reiter, entitled *Method and Apparatus for Referring Expression Generation*.
U.S. Appl. No. 15/093,365, filed Apr. 7, 2016; In re: Logan et al., entitled *Method and Apparatus for Updating a Previously Generated Text*.
Notice of Allowance for U.S. Appl. No. 15/421,921 dated Mar. 14, 2018.
Office Action for U.S. Appl. No. 15/074,425 dated Feb. 26, 2018.
Dalianis, H. et al.; "*Aggregation in Natural Language Generation*" Trends in Natural Language Generation, an Artificial Intelligence Perspective; pp. 88-105; dated 1996.
International Preliminary Report on Patentability for Application No. PCT/IB2012/056513 dated May 19, 2015.
International Preliminary Report on Patentability for Application No. PCT/IB2012/056514 dated May 19, 2015.
International Preliminary Report on Patentability for Application No. PCT/IB2012/057773 dated Jun. 30, 2015.
International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.
International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2013/058131 dated Jul. 3, 2014.
International Search Report and Written Opinion for Application No. PCT/IB2014/060846 dated Feb. 4, 2015.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 15/074,425 dated May 10, 2017.
Office Action for U.S. Appl. No. 15/188,423 dated Oct. 23, 2017.
Office Action for U.S. Appl. No. 15/421,921 dated Sep. 27, 2017.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/311,806; entitled Method and Apparatus for Alert Validation; In re: Reiter, filed Jun. 23, 2014.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.
Office Action for U.S. Appl. No. 15/188,423 dated Jul. 20, 2018.
Notice of Allowance for U.S. Appl. No. 15/188,423 dated Dec. 28, 2018.
Notice of Allowance for U.S. Appl. No. 16/009,006 dated Jul. 31, 2019.
Office Action for U.S. Appl. No. 15/074,425 dated Nov. 27, 2018.
Office Action for U.S. Appl. No. 15/188,423 dated Oct. 30, 2018.
Office Action for U.S. Appl. No. 16/009,006 dated Dec. 3, 2018.
Office Action for U.S. Appl. No. 15/074,425 dated Oct. 4, 2019.

* cited by examiner

METHOD AND APPARATUS FOR SPATIAL DESCRIPTIONS IN AN OUTPUT TEXT

CROSS-REFERENCE TO RELATED APPLICATIONS

This application is a continuation of International Application No. PCT/IB2012/056513, filed Nov. 16, 2012, which is hereby incorporated herein in its entirety by reference.

TECHNOLOGICAL FIELD

Embodiments of the present invention relate generally to natural language generation technologies and, more particularly, relate to a method, apparatus, and computer program product for expressing spatial descriptions in an output text.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "Securities markets rose steadily through most of the morning, before sliding downhill late in the day." In some cases, an NLG system may further be configured to generate an output text in conjunction with other modalities, such as an annotated graph, an image, speech or the like.

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. Other non-recurrent or unstructured data may be input into an NLG in some examples. In some examples, the output of the NLG system is text in a natural language (e.g. English, Japanese or Swahili), but may also be in the form of synthesized speech.

BRIEF SUMMARY

Methods, apparatuses, and computer program products are described herein that are configured to linguistically describe a spatial area in an output text generated by a natural language generation system. In some example embodiments, a method is provided that comprises generating one or more descriptors and/or one or more combinations of descriptors that are configured to linguistically describe at least a portion of a set of points within a spatial area. The method of this embodiment may also include scoring each of the one or more descriptors and/or one or more combinations of the one or more descriptors. The method of this embodiment may also include selecting a descriptor or combination of descriptors that has the highest score when compared to other descriptors or combination of descriptors, providing the descriptor or combination of descriptors satisfies a threshold.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

In some examples, an NLG system may be configured to generate spatial descriptions referring to the location of one or more of an event (e.g. a location of an accident, a parade, and/or the like), an occurrence (e.g. presence of rain, population density numbers and/or the like), an object (e.g. a person, an item and/or the like), a pattern (e.g. traffic patterns and/or the like), and/or the like in a data set. In some examples, one or more of the event, the occurrence, the object, the pattern, or the like may be spatially contiguous or spatially non-contiguous in the spatial area described by the data set and may further be described at a particular time instant or over a period of time instances. For example, a descriptor may be used to identify a person "on the right" side" of a spatial area "at 10:00 am", a rise in crime "in North Chicago over the last ten years", an increase in population "from the last census in many parts of the U.S. south east" and/or the like.

The one or more of the event, the occurrence, the object, the pattern, or the like are generally input in the form of a set of points indicative of a location in a spatial area that are extracted from a raw data input. The spatial data may be indicative of a geographic location (e.g. as in a geographic information system), a relative position, a location in a multi-dimensional frame of reference and/or the like.

According to some example embodiments, a method, apparatus and computer program product, as described herein, is configured to determine at least one partition for describing the spatial area that includes the set of points that are representative of events, occurrences, objects, patterns, and/or the like in a data set. A partition is a means of segmenting a spatial area in a particular domain (e.g. using cardinal directions, altitudes or the like in geography, directions or points of interest in a two dimensional image and/or the like). In some examples, the partition may be used to model the spatial area. The elements of a partition may overlap with the elements of other partitions that are defined, but, in some examples, each of the partitions is configured to cover the entire spatial area. For example, areas based on cardinal directions, altitudes and/or the like can be used to exhaustively describe a geographic spatial area.

One or more descriptors may then be selected to linguistically describe the events, occurrences, objects, patterns, points and/or the like. A descriptor is the linguistically describable name of an element within a partition (e.g. based on the cardinal directions of north, east, south and west, directions or regions such as the left side or the right side and/or the like). As is described herein, descriptors from multiple partitions may be combined to describe the events, occurrences, objects and/or the like (e.g. "regions of Northern Scotland above 200 meters").

In some example embodiments, a brute force approach may be used to determine which descriptors within the one or more partitions are to be selected and/or combined to describe the set of points in the data that provide spatial information tied to events, occurrences, objects and/or the like. In such a case, each potential descriptor or combination of descriptors (e.g. starting with a single descriptor then pairs of descriptors, etc.) are scored to determine how successfully the particular descriptor or combination of descriptors describes the set of points. The success of describing the set of points may be based on or otherwise judged in relation to the number of false positives and/or false negatives that arise. A false positive is a point within the spatial area that is denoted by the one or more descriptors but does not contain the event, occurrence, object and/or the like to be described (e.g. a point or set of points within the spatial area that do not contain rain, but are indicated as containing rain based on the one or more descriptors chosen). False negatives are points in which the event, occurrence, object and/or the like to be described does occur but the description does not denote (e.g. a point or set of points that do contain rain, but are indicated as not containing rain based on the one or more descriptors chosen). Alternatively or additionally, scoring may also be accomplished based on simplicity, coherence, external constraints, the domain and/or the like.

As such, the descriptor or combination of descriptors that have the highest score is chosen to describe the set of points in the spatial area. In some examples, the score of a chosen descriptor or combination of descriptors may be required to satisfy a predetermined threshold and/or satisfy one or more constraints prior to being selected. The descriptor or combination of descriptors may then be used by the NLG system to linguistically describe the one or more points in the spatial area.

For example, and with reference to a weather domain, in order to generate a weather forecast, weather data (e.g. weather prediction model data, rain fall sensors and/or the like) may define a set of points within a spatial area that indicate the presence of a particular weather event. Based on the set of points that indicate the presence of the particular weather event, one or more descriptors of one or more partitions may be used, such as a partition of a city based on cardinal direction (e.g. "the south side" of a city), neighborhood boundaries (e.g. "rain in the Bronx"), major thoroughfares (e.g. "east of I-95") and/or the like, that can be linguistically described and are readily understood by the general public. For example an output text may include "A band of precipitation, moving from east to west, contains moisture that may fall as snow in areas having an altitude of 400 meters or greater that are west of Aberdeen." A descriptor or combination of descriptors, may, in some examples, describe as much as possible of the spatial area in which the event occurs, while avoiding describing a spatial area in which the event does not occur.

Figure 1:
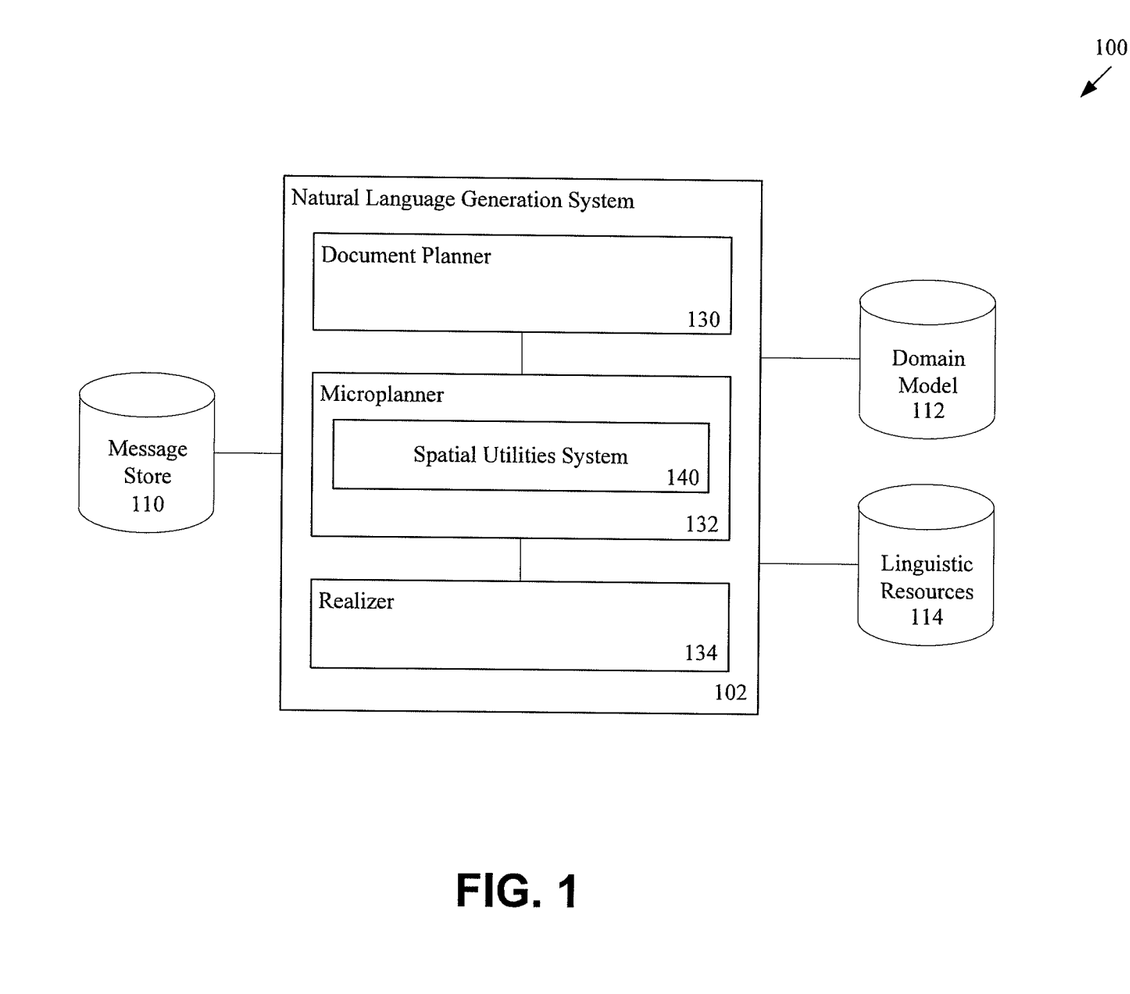
FIG. 1 is a schematic representation of natural language generation environment that may benefit from some example embodiments of the present invention.

FIG. 1 is an example block diagram of example components of an example natural language generation environment 100. In some example embodiments, the natural language generation environment 100 comprises a natural language generation system 102, message store 110, a domain model 112 and/or linguistic resources 114. The natural language generation system 102 may take the form of, for example, a code module, a component, circuitry and/or the like. The components of the natural language generation environment 100 are configured to provide various logic (e.g. code, instructions, functions, routines and/or the like) and/or services related to the natural language generation system, the microplanner and/or a spatial utilities system.

A message store 110 or knowledge pool is configured to store one or more messages that are accessible by the natural language generation system 102. Messages are language independent data structures that correspond to informational elements in a text and/or collect together underlying data, referred to as slots, arguments or features, which can be presented within a fragment of natural language such as a phrase or sentence. Messages may be represented in various ways; for example, each slot may consist of a named attribute and its corresponding value; these values may recursively consist of sets of named attributes and their values, and each message may belong to one of a set of predefined types. The concepts and relationships that make up messages may be drawn from an ontology (e.g. a domain model 112) that formally represents knowledge about the application scenario. In some examples, the domain model 112 is a representation of information about a particular domain. For example, a domain model may contain an ontology that specifies the kinds of objects, instances, concepts and/or the like that may exist in the domain in concrete or abstract form, properties that may be predicated of the objects, concepts and the like, relationships that may hold between the objects, concepts and the like, and representations of any specific knowledge that is required to function in the particular domain.

In some examples, messages are created based on a requirements analysis as to what is to be communicated for a particular scenario (e.g. for a particular domain or genre). A message typically corresponds to a fact about the underlying data (for example, the existence of some observed event) that could be expressed via a simple sentence (although it may ultimately be realized by some other linguistic means). For example, to linguistically describe a weather event, such as a rain storm, a user may want to know the spatial location of the rain storm, when it will reach the user's location, the last time or location rain was detected and/or the like. In some cases, the user may not want to know about a weather event, but instead want to be warned in an instance in which the weather presents a danger in a particular area; for example: "High winds predicted this evening."

In some examples, a message is created in an instance in which the raw input data warrants the construction of such a message. For example, a wind message would only be constructed in an instance in which wind data was present in the raw input data. Alternatively or additionally, while some messages may correspond directly to observations taken from a raw data input, others, however, may be derived from the observations by means of a process of inference or based on one or more detected events. For example, the presence of rain may be indicative of other conditions, such as the potential for snow at some temperatures.

Messages may be instantiated based on many variations of source data, such as, but not limited to, time series data, time and space data, data from multiple data channels, an ontology, sentence or phrase extraction from one or more texts, a text, survey responses, structured data, unstructured data and/or the like. For example, in some cases, messages may be generated based on text related to multiple news articles focused on the same or similar news story in order to generate a news story; whereas, in other examples, messages may be built based on survey responses and/or event data.

Messages may be annotated with an indication of their relative importance; this information can be used in subsequent processing steps or by the natural language generation system 102 to make decisions about which information may be conveyed and which information may be suppressed. Alternatively or additionally, messages may include information on relationships between the one or more messages.

In some example embodiments, a natural language generation system, such as natural language generation system 102, is configured to generate words, phrases, sentences, text or the like which may take the form of a natural language text. The natural language generation system 102 comprises a document planner 130, a microplanner 132 and/or a realizer 134. The natural language generation system 102 may also be in data communication with the message store 110, the domain model 112 and/or the linguistic resources 114. In some examples, the linguistic resources 114 include, but are not limited to, text schemas, communication context, aggregation rules, reference rules, lexicalization rules and/or grammar rules that may be used by one or more of the document planner 130, the microplanner 132 and/or the realizer 134. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner 130 is configured to input the one or more messages from the message store 110 and to determine how to arrange those messages in order to describe one or more patterns in the one or more data channels derived from the raw input data. The document planner 130 may also comprise a content determination process that is configured to select the messages, such as the messages that contain a representation of the data that is to be output via a natural language text.

The document planner 130 may also comprise a structuring process that determines the order of messages to be included in a text. In some example embodiments, the document planner 130 may access one or more text schemas for the purposes of content determination and document structuring. A text schema is a rule set that defines the order in which a number of messages are to be presented in a document. For example, a rain message may be described prior to a temperature message. In other examples, a wind message may be described after, but in a specific relation to, the rain message.

The output of the document planner 130 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast, sequence and/or the like) to each other.

The microplanner 132 is configured to construct a text specification based on the document plan from the document planner 130, such that the document plan may be expressed in natural language. In some example embodiments, the microplanner 132 may convert the one or more messages in the document plan into one or more phrase specifications in a text specification. In some example embodiments, the microplanner 132 may perform aggregation, lexicalization and referring expression generation.

In some examples, aggregation includes, but is not limited to, determining whether two or more messages can be combined together linguistically to produce a more complex phrase specification. For example, one or more messages may be aggregated so that both of the messages can be described by a single sentence. In some examples, lexicalization includes, but is not limited to, choosing particular words for the expression of concepts and relations. In some examples, referring expression generation includes, but is not limited to, choosing how to refer to an entity so that it can be unambiguously identified by the reader.

In some example embodiments, the microplanner 132 may embody or otherwise may be in data communication with a spatial utilities system 140. The microplanner 132 may interact with the spatial utilities system 140 in an instance in which the microplanner detects spatial data in a slot of a message in the document plan tree input from the document planner 130. As such, the spatial utilities system 140 is configured to determine or otherwise identify the communicative context of an output text as is provided via the domain model 112 and/or the linguistic resources 114. In some example embodiments, the communicative context may signal, to the spatial utilities system 140, a domain for which the text is to be generated. In other examples, the communicative context may signal to the spatial utilities system 140, a location of a reader of the output text, a sophistication of a reader of the output text, or the more general location that is the topic of the output text. Alternatively or additionally, a communicative context may also include, but is not limited to, the current time that the output text is being generated, user preferences, reader preferences, language preferences, communicative intent and/or the like. In some example embodiments, the spatial utilities system 140 may be configured to output a linguistic description of a set of points, such as points within the spatial area that include the events, occurrences, objects, patterns or the like to be described.

The spatial utilities system 140 may input the spatial data detected in a slot of a message in the document plan tree input from the document planner 130 as a set of points that are representative of a spatial area to be described. The spatial utilities system 140 may linguistically describe the set of points within the spatial area using a coordinate system, such as latitude and longitude. However, in other example embodiments, the spatial utilities system 140 may linguistically describe the set of points within the spatial area using one or more descriptors, where each of the descriptors is defined by a partition. As such, the spatial utilities system 140 may input or otherwise identify a spatial area that is to be described by the output text.

Based on the spatial area to be described, the spatial utilities system 140 may determine one or more partitions that may be used to linguistically describe the entire spatial area (e.g. cardinal directions to describe geography, right side or left side to describe a two dimensional image and/or the like). The spatial utilities system 140 is further configured to determine one or more descriptors defined by the one or more elements of a partition that may be used to linguistically describe the set of points within the spatial area. In one example embodiment, each descriptor may be tested as a stand-alone or single descriptor to determine if a single descriptor is capable of describing the set of points. Each single descriptor is scored based on the portion of the set of points that are described by the descriptor. Points may be deducted from a score based on the presence of false positives and/or false negatives.

Once scored, each descriptor may be compared to a score that must be obtained in order for a descriptor to be chosen, such as a predetermined single threshold descriptor score. The predetermined single descriptor threshold score may be defined by a domain model, communicative context or the like. Providing that a score for a descriptor satisfies the threshold, the descriptor with the highest score is chosen as the descriptor to linguistically describe the set of points.

In an instance in which a single descriptor is not sufficient (e.g. it does not satisfy a predetermined single threshold descriptor score), the spatial utilities system 140 is then configured to generate one or more combinations of descriptors. In some cases, the spatial utilities system 140 may generate and score pairs of descriptors. Initially, the spatial utilities system 140 may then determine if any of the pair of descriptors satisfy a threshold, such as a predetermined descriptor combination threshold score. The predetermined descriptor combination threshold score may be defined by a domain model, communicative context or the like. If the threshold is satisfied, then the pair of descriptors having the highest score is chosen. If the threshold is not satisfied, then the number of descriptors that can be combined is incremented by one and the process continues until all combinations are exhausted or a combination of descriptors satisfies the threshold. Alternatively or additionally, all combinations of descriptors may also be generated and scored, such that the combination with the highest score that satisfies the threshold is chosen. In some examples, the number of descriptors to be combined is based on the importance of the event to be described in the output text.

In some example embodiments, neither a single descriptor nor a combination of descriptors satisfies a threshold value and, as such, no descriptor or combination of descriptors will be chosen by the spatial utilities system 140. In such cases, and in one example embodiment, the spatial utilities system 140 may then select the highest scoring single descriptor and include a modifier such as, but not limited to: "in many areas", "mostly" and/or the like. The modifier is added to ensure the descriptor is modified so that it no longer contains false positives and/or false negatives: for example, "In most areas of the city, there will be rain". The modifier is chosen from a set of modifiers based on the relationship between the set of points and the descriptor chosen.

Using the partition, the one or more descriptors and the determined relationship, the spatial utilities system 140 is configured to generate a linguistic description of the spatial area subject to one or more external constraints. External constraints may include but are not limited to constraints imposed by a domain model, user preferences, language constraints, output text constraints, previously referred-to partition and/or the like. The spatial utilities system 140 may then output or otherwise provide the linguistic description of the set of points in the spatial area to the microplanner 132. The output of the microplanner 132, in some example embodiments, is a tree-structured realization specification whose leaf-nodes are phrase specifications, and whose internal nodes express rhetorical relations between the leaf nodes.

A realizer 134 is configured to traverse a text specification output by the microplanner 132 to express the text specification in natural language. The realization process that is applied to each phrase specification and further makes use of a grammar (e.g. the grammar of the linguistic resources 114), which specifies the valid syntactic structures in the language and further provides a way of mapping from phrase specifications into the corresponding natural language sentences. The output of the process is, in some example embodiments, a natural language text. In some examples, the natural language text may include embedded mark-up.

Figure 2:
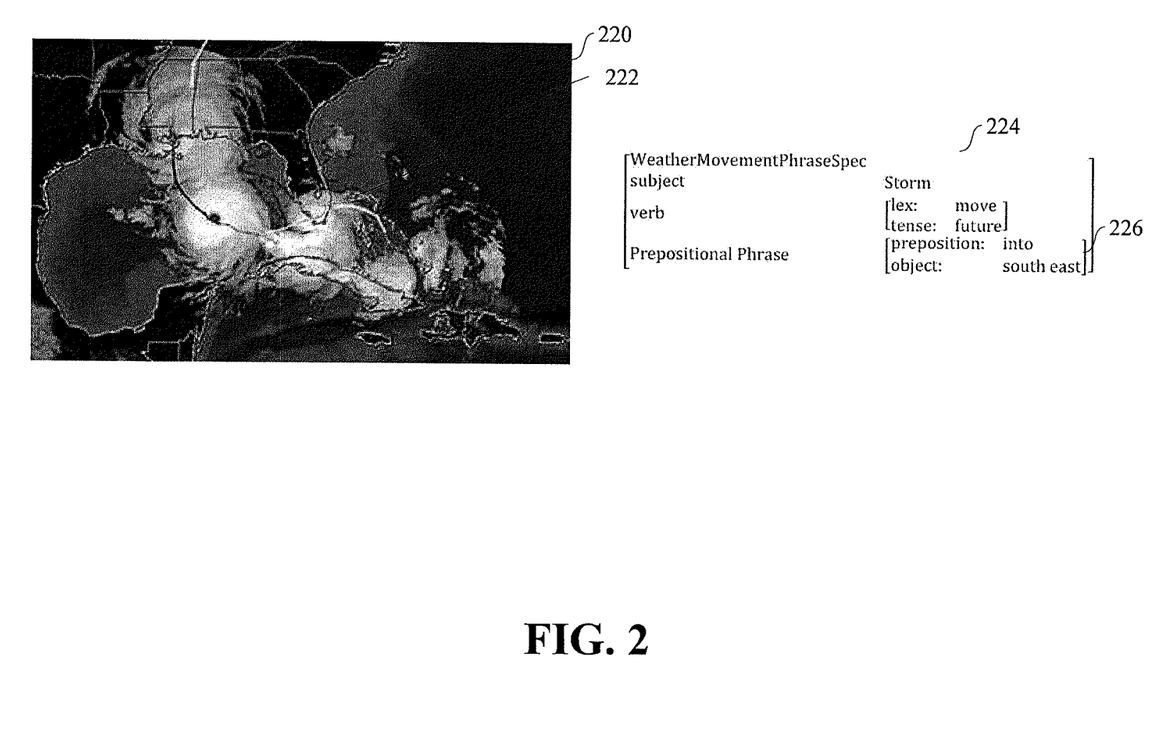
FIG. 2 illustrates an example description of a spatial area using a spatial utilities system according to some example embodiments described herein.

FIG. 2 illustrates an image 220 that is representative of a weather data in the spatial area of the southeast United States. The weather data in this example may be related to the presence of a hurricane 222 and/or the potential path of the hurricane 222. The weather data may be extracted from the image or otherwise may be received via radar data, sensor data and/or the like. The weather data represented by image 220, may for example, include partitions such as those based on direction, having descriptors north, south, east, west, north east, north west and/or the like, and points of interest, having descriptors such as Miami, the Gulf Coast, the Caribbean or the like. Further, the communicative context of the description of hurricane 222 may also be determined.

In this example the communicative context may determine a threshold value for the selection of the one or more descriptors. For example, for an audience in the United Kingdom, the descriptor "south east U.S." is likely permissible (e.g. false positives are allowable), because the person in the U.K. is not expecting a direct impact by the storm; however, for an audience in North Carolina (for whom false positives would not be allowed), such a descriptor would be ominous, because it is suggestive that a dangerous storm is going to threaten North Carolina. As such, assuming the linguistic output is for an audience in the United Kingdom, the location of the hurricane as being "in the south east" may be selected and output as a prepositional phrase, such as prepositional phrase 226, to a phrase specification, such as phrase specification 224.

Figure 3:
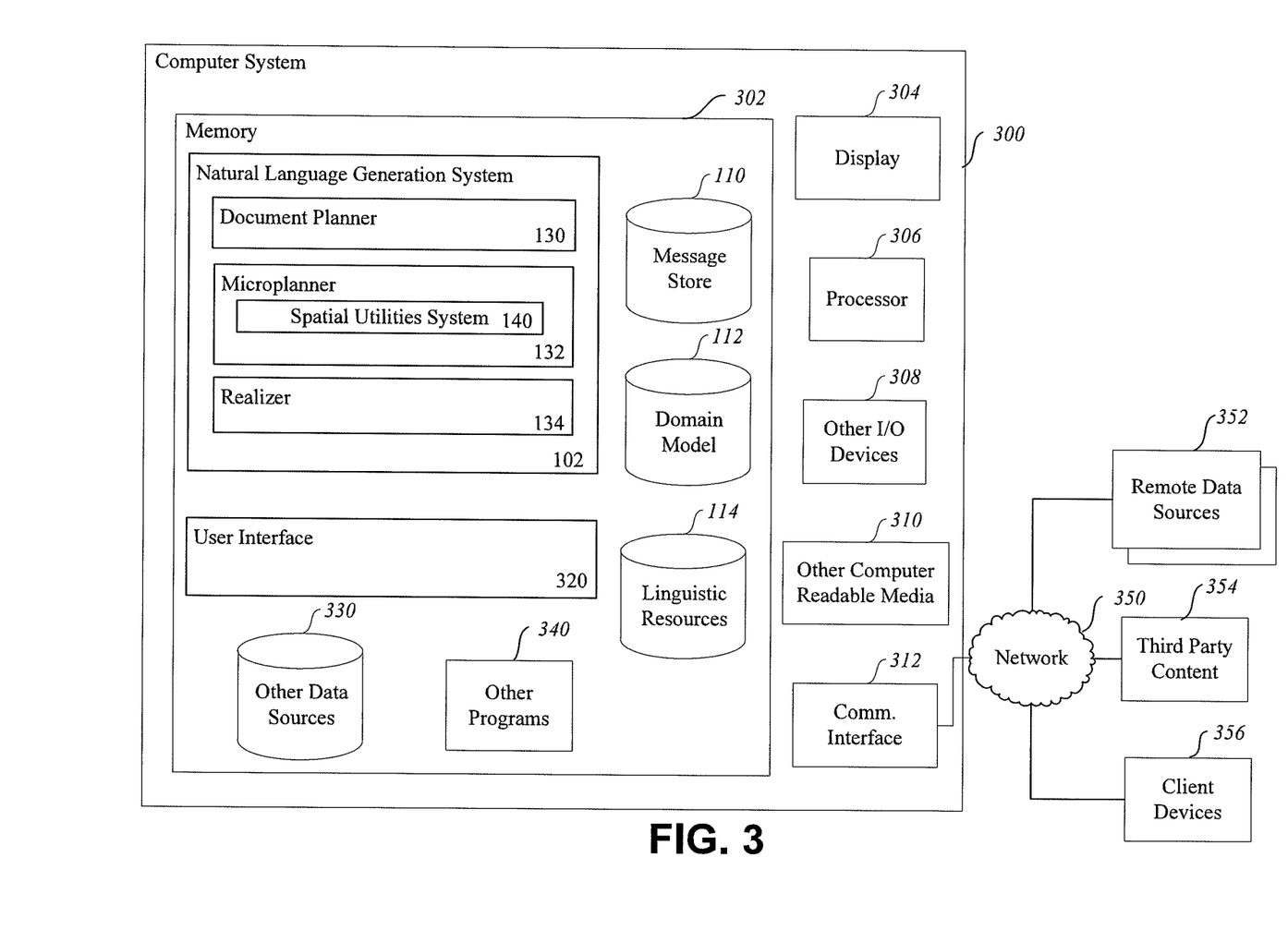
FIG. 3 illustrates a block diagram of an apparatus that embodies a natural language generation system in accordance with some example embodiments of the present invention.

FIG. 3 is an example block diagram of an example computing device for practicing embodiments of an example spatial utilities system. In particular, FIG. 3 shows a computing system 300 that may be utilized to implement a natural language generation environment 100 having a natural language generation system 102 including, in some examples, a document planner 130, a microplanner 132, comprising a spatial utilities system 140, and/or a realizer 134 and/or a user interface 320. One or more general purpose or special purpose computing systems/devices may be used to implement the natural language generation system 102 and/or the user interface 320. In addition, the computing system 300 may comprise one or more distinct computing systems/devices and may span distributed locations. In some example embodiments, the natural language generation system 102 may be configured to operate remotely via the network 350. In other example embodiments, a pre-processing module or other module that requires heavy computational load may be configured to perform that computational load and thus may be on a remote device or server. For example, the realizer 134 or the spatial utilities system 140 may be accessed remotely. In other example embodiments, a user device may be configured to operate or otherwise access the natural language generation system 102. Furthermore, each block shown may represent one or more such blocks as appropriate to a specific example embodiment. In some cases one or more of the blocks may be combined with other blocks. Also, the natural language generation system 102 may be implemented in software, hardware, firmware, or in some combination to achieve the capabilities described herein.

In the example embodiment shown, computing system 300 comprises a computer memory ("memory") 302, a display 304, one or more processors 306, input/output devices 308 (e.g., keyboard, mouse, CRT or LCD display, touch screen, gesture sensing device and/or the like), other computer-readable media 310, and communications interface 312. The processor 306 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 3 as a single processor, in some embodiments the processor 306 comprises a plurality of processors. The plurality of processors may be in operative communication with each other and may be collectively configured to perform one or more functionalities of the spatial utilities system as described herein.

The natural language generation system 102 is shown residing in memory 302. The memory 302 may comprise, for example, transitory and/or non-transitory memory, such as volatile memory, non-volatile memory, or some combination thereof. Although illustrated in FIG. 3 as a single memory, the memory 302 may comprise a plurality of memories. The plurality of memories may be embodied on a single computing device or may be distributed across a plurality of computing devices collectively configured to function as the natural language system, the microplanner and/or the spatial utilities system. In various example embodiments, the memory 302 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some examples, the natural language generation system 102 may be stored remotely, such that reside in a "cloud." As such, the natural language generation system 102 may function as or otherwise be provided as software as a service.

In other embodiments, some portion of the contents, some or all of the components of the natural language generation system 102 may be stored on and/or transmitted over the other computer-readable media 310. The components of the natural language generation system 102 preferably execute on one or more processors 306 and are configured to enable operation of a spatial utilities system, as described herein.

Alternatively or additionally, other code or programs 340 (e.g., an administrative interface, one or more application programming interface, a Web server, and the like) and potentially other data repositories, such as other data sources 330, also reside in the memory 302, and preferably execute on one or more processors 306. Of note, one or more of the components in FIG. 3 may not be present in any specific implementation. For example, some embodiments may not provide other computer readable media 310 or a display 304.

The natural language generation system 102 is further configured to provide functions such as those described with reference to FIG. 1. The natural language generation system 102 may interact with the network 350, via the communications interface 312, with remote data sources 352 (e.g. remote reference data, remote performance data, remote aggregation data, remote knowledge pools and/or the like), third-party content providers 354 and/or client devices 356. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instances, the network 350 may take the form of the internet or may be embodied by a cellular network such as an LTE based network. In this regard, the communications interface 312 may be capable of operating with one or more air interface standards, communication protocols, modulation types, access types, and/or the like. The client devices 356 include desktop computing systems, notebook computers, mobile phones, smart phones, personal digital assistants, tablets and/or the like. In some example embodiments, a client device may embody some or all of computing system 300.

In an example embodiment, components/modules of the natural language generation system 102 are implemented using standard programming techniques. For example, the natural language generation system 102 may be implemented as a "native" executable running on the processor 306, along with one or more static or dynamic libraries. In other embodiments, the natural language generation system 102 may be implemented as instructions processed by a virtual machine that executes as one of the other programs 340. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the natural language generation system 102, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. The message store 110, the domain model 112 and/or the linguistic resources 114 may be implemented as one or more database systems, file systems, or any other technique for storing such information, or any combination of the above, including implementations using distributed computing techniques. Alternatively or additionally, the message store 110, the domain model 112 and/or the linguistic resources 114 may be local data stores but may also be configured to access data from the remote data sources 352.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the natural language generation system 102 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 4:
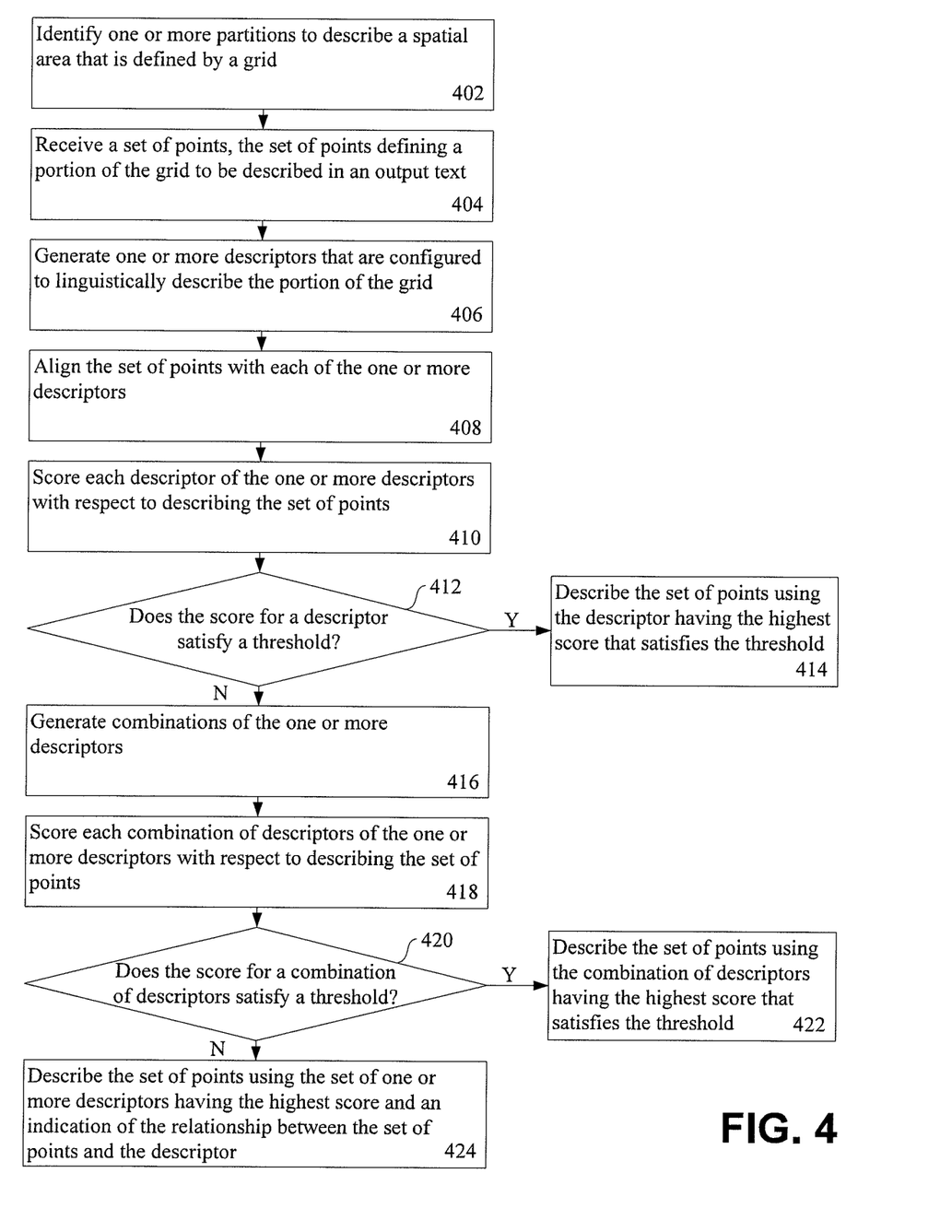
FIG. 4 illustrates a flowchart that may be performed by a spatial utilities system in accordance with some example embodiments of the present invention.

FIG. 4 is a flowchart illustrating an example method performed by a spatial utilities system in accordance with some example embodiments described herein. As is shown in operation 402, an apparatus may include means, such as the microplanner 132, the spatial utilities system 140, the processor 306, or the like, for identifying one or more partitions to describe a spatial area that is defined by a grid. As is shown in operation 404, an apparatus may include means, such as the microplanner 132, the spatial utilities system 140, the processor 306, or the like, for receiving a set of points, the set of points defining a portion of the grid to be described in an output text. The set of points are received from a data set, found in slots in a message, provided by a user, identified by another program and/or the like. In some example embodiments the set of points may be compiled by collecting one or more points from each of the frames in a sequence occurring over a time period where each frame represents one or more of the event, the occurrence, the object, the pattern or the like in the spatial area described by the data set.

As is shown in operation 406, an apparatus may include means, such as the microplanner 132, the spatial utilities system 140, the processor 306, or the like, for generating one or more descriptors that are configured to linguistically describe the portion of the grid. In some example embodiments, the descriptors are generated based on one or more elements in one or more selected partitions and are configured to linguistically describe at least a portion of the set of points. The one or more partitions and/or the one or more descriptors are provided by a domain model, a user and/or the like and are selectable based on the communicative context, user preference or the like.

As is shown in operation 408, an apparatus may include means, such as the microplanner 132, the spatial utilities system 140, the processor 306, or the like, for aligning the set of points with each of the one or more descriptors. As is shown in operation 410, an apparatus may include means, such as the microplanner 132, the spatial utilities system 140, the processor 306, or the like, for scoring each descriptor of the one or more descriptors with respect to describing the set of points.

As is shown in decision operation 412, an apparatus may include means, such as the microplanner 132, the spatial utilities system 140, the processor 306, or the like, for determining whether the score for each descriptor of the one more descriptors satisfies a threshold, such as the predetermined single descriptor threshold score. In an instance in which the threshold is satisfied, then, as is shown in operation 414, an apparatus may include means, such as the microplanner 132, the spatial utilities system 140, the processor 306, or the like, for describing the set of points using the descriptor having the highest score that satisfies the threshold. As such, the descriptor with the highest score is output or otherwise provided for use by the microplanner.

In an instance in which the threshold is not satisfied, then, as is shown in operation 416, an apparatus may include means, such as the microplanner 132, the spatial utilities system 140, the processor 306, or the like, for generating combinations of the one or more descriptors. In some examples an exhaustive set of descriptor combinations may be generated and scored. Alternatively or additionally, in other examples, pairs of descriptors, then sets of three descriptors, up to some pre-specified number of descriptors may be generated and scored separately. For example pairs of descriptors may be generated and scored, if there are not any pairs of descriptors that that satisfy the threshold, then combinations of three descriptors are built and scored until the combinations of descriptors are exhausted.

As is shown in operation 418, an apparatus may include means, such as the microplanner 132, the spatial utilities system 140, the processor 306, or the like, for scoring each combination of descriptors of the one or more descriptors with respect to describing the set of points. In some example embodiments, each descriptor or combination of descriptors may be assigned a score based on the number of points within the set of points it covers over a time period. For example, a descriptor may receive a score based on the notions of precision and recall, whereby the precision of a descriptor is calculated as the proportion of the described points that fall within the set of points to be described, thus providing a measure of the number of false positives, and the recall of the descriptor is calculated as the proportion of the set of points to be described that is captured by the descriptor, thus providing a measure of the number of false negatives. In some examples, the measures of precision and recall may then be combined in some manner that attributes appropriate weightings to false positives and false negatives on the basis of the communicative context, the domain, and the like. In some examples, false positives and false negatives may be equally weighted, so that the score for the descriptor is calculated as the harmonic mean of the precision and recall scores, also known as the balanced F-score, computed, in some example embodiments, as (2×precision× recall)/(precision+recall). Alternatively or additionally, other scoring mechanisms may be used in conjunction with the spatial utilities system 140, such scoring methods include, but are not limited to, scores based on receiver operating characteristic (ROC) curves which are created by plotting the fraction of true positives out of the positives (TPR=true positive rate) vs. the fraction of false positives out of the negatives (FPR=false positive rate) (e.g. product of TPR and (1-FPR)) and/or the like.

As is shown in decision operation 420, an apparatus may include means, such as the microplanner 132, the spatial utilities system 140, the processor 306, or the like, for determining whether the score for each combination of descriptors of the one more descriptors satisfies a threshold, such as the predetermined descriptor combination threshold score. In an instance in which the threshold is satisfied, then, as is shown in operation 422, an apparatus may include means, such as the microplanner 132, the spatial utilities system 140, the processor 306, or the like, for describing the set of points using the combination of descriptors having the highest score that satisfies the threshold. As such, the combination of descriptors with the highest score is output or otherwise provided for use by the microplanner. In an instance in which the threshold is not satisfied, then, as is shown in decision operation 424, an apparatus may include means, such as the microplanner 132, the spatial utilities system 140, the processor 306, or the like, for describing the set of points using the set of one or more descriptors having the highest score and an indication of the relationship between the set of points and the descriptor; for example, "in areas in the north", or "spots of activity in the south" and/or the like. Alternatively or additionally, the set of points may be described using one or more descriptors having the highest score, subject to external constraints, and an indication of the relationship between the set of points and the descriptor.

FIG. 4 illustrates an example flowchart of the operations performed by an apparatus, such as computing system 300 of FIG. 3, in accordance with example embodiments of the present invention. It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 302 of an apparatus employing an embodiment of the present invention and executed by a processor 306 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart's block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart's block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart's block(s). As such, the operations of FIG. 4, when executed, convert a computer or processing circuitry into a particular machine configured to perform an example embodiment of the present invention. Accordingly, the operations of FIG. 4 define an algorithm for configuring a computer or processor, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described herein. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computer-implemented method for transforming raw input data expressed in a non-linguistic format into an output in a format that can be expressed linguistically, the method comprising:
generating, by a processor, one or more combinations of one or more descriptors that are configured to linguistically describe at least a portion of a set of points within a spatial area;
identifying geographic location data associated with a user;
scoring, by the processor, each of the one or more combinations of the one or more descriptors based at least in part on the geographic location data associated with the user, wherein a score for a combination of the one or more descriptors is reduced based at least in part on a selection between one or more of a false positive measure and a false negative measure associated with the combination of the one or more descriptors, wherein the false positive measure is based on a first number of points within the set of points within the spatial area that is denoted by the combination of the one or more descriptors but is excluded from the portion of the set of points to be described, and wherein the false negative measure is based on a second number of points within the portion of the set of points to be described that are not described by the combination of the one or more descriptors;
selecting, by the processor, the combination of descriptors of the one or more combinations of the one or more descriptors to linguistically describe at least the portion of the set of points that are to be linguistically described, when the combination of descriptors satisfies a predetermined descriptor combination threshold score and has a highest score when compared to one or more other combinations of the one or more descriptors, wherein the predetermined descriptor combination threshold score is selected based on a communicative context associated with a linguistic description of at least the portion of the set of points that are to be linguistically described;
determining, by the processor, a relationship between the combination of descriptors and the portion of the set of points that are to be linguistically described, the relationship drawn from an ontology;
generating, by the processor, the linguistic description of at least the portion of the set of points that are to be linguistically described based on the combination of descriptors and the relationship; and
outputting, by the processor, geographic location specific natural language text generated based at least in part on traversing a text specification, the text specification generated based at least in part on the linguistic description of at least the portion of the set of points, wherein the geographic location specific natural language text further comprises an indication to a remote device of a specific event occurrence at a specific time.

2. A method according to claim 1, further comprising:
scoring, by the processor, each of the one or more combinations of the one or more descriptors; and
selecting, by the processor, a descriptor of the one or more combinations of the one or more descriptors to linguistically describe at least the portion the set of points that are to be linguistically described, when the descriptor satisfies a predetermined single descriptor threshold score and has the highest score when compared with each of the one or more combinations of one or more other descriptors.

3. A method according to claim 2, further comprising:
selecting, by the processor, a descriptor of the one or more combinations of the one or more descriptors that has the highest score when compared with each of the one or more combinations of the one or more other descriptors when the descriptor of the one or more combinations of the one or more descriptors fails to satisfy the predetermined single descriptor threshold score and the combination of descriptors of the one or more combinations of the one or more descriptors fails to satisfy the predetermined descriptor combination threshold score;
determining, by the processor, a relationship between the one or more of the set of points and the descriptor; and
generating, by the processor, the linguistic description of at least the portion of the set of points that are to be linguistically described based on the descriptor and the relationship.

4. A method according to claim 1, further comprising:
identifying, by the processor, the spatial area that is defined by a grid; and
determining, by the processor, one or more partitions that are to be used to linguistically describe the spatial area.

5. A method according to claim 4, further comprising:
generating, by the processor, the one or more combinations of the one or more descriptors based on the one or more partitions that are configured to linguistically describe at least a portion of the set of points; and
aligning, by the processor, the at least the portion of the set of points with each of the one or more combinations of the one or more descriptors.

6. A method according to claim 4, wherein each element of the one or more partitions defines the one or more combinations of the one or more descriptors.

7. A method according to claim 4, wherein the one or more partitions are selected based on at least one of a communicative context or a domain model, wherein the domain model contains an ontology.

8. A method according to claim 1, wherein one or more points that belong outside of the set of points are linguistically described.

9. A method according to claim 1, wherein the text specification comprises a tree-structured text specification.

10. A method according to claim 1, further comprising:
determining, by the processor, second geographic location data associated with the set of points within the spatial area,
wherein the predetermined descriptor combination threshold score is based at least in part on the second geographic location data associated with the set of points within the spatial area.

11. A method according to claim 1, wherein identifying the location associated with the geographic location specific natural language text to output for the user comprises:
identifying the geographic location data comprising a first location associated with the set of points within the spatial area.

12. A method according to claim 1, wherein selecting the combination of the one or more combinations of descriptors comprises:

determining each of the one or more combinations of one or more descriptors does not satisfy the predetermined descriptor combination threshold score;

selecting the combination of the one or more combinations of the one or more descriptors to linguistically describe at least the portion of the set of points that are to be linguistically described associated with the highest score;

determining a relationship between the combination and at least the portion of the set of points that are to be linguistically described associated with the highest score;

selecting a modifier from a possible set of modifiers based on the relationship between the combination of the descriptors and at least the portion of the set of points that are to be linguistically described associated with the highest score; and selecting the combination of the one or more descriptors including the modifier.

13. A method according to claim 1, wherein scoring each of the one or more combinations of the one or more descriptors is further based at least in part on second geographic location data associated with at least the portion of the set of points within the spatial area.

14. An apparatus for transforming raw input data expressed in a non-linguistic format into an output in a format that can be expressed linguistically, the apparatus comprising at least one processor and at least one memory including computer program code, the at least one memory and the computer program code configured to, with the at least one processor, cause the apparatus to at least:

generate one or more combinations of one or more descriptors that are configured to linguistically describe at least a portion of a set of points within a spatial area;

identify geographic location data associated with a user;

score each of the one or more combinations of the one or more descriptors based at least in part on the geographic location data associated with the user, wherein a score for the combination of the one or more descriptors is reduced based at least in part on a selection between one or more of a false positive measure and a false negative measure associated with the combination of the one or more descriptors, wherein the false positive measure is based on a first number of points within the set of points within the spatial area that is denoted by the combination of the one or more descriptors but is excluded from the portion of the set of points to be described, and wherein the false negative measure is based on a second number of points within the portion of the set of points to be described that are not described by the combination of the one or more descriptors;

select a combination of descriptors of the one or more combinations of the one or more descriptors to linguistically describe at least the portion of the set of points that are to be linguistically described, when the combination of descriptors satisfies a predetermined descriptor combination threshold score and has a highest score when compared to one or more other combinations of the one or more descriptors, wherein the predetermined descriptor combination threshold score is selected based on a communicative context associated with a linguistic description of at least the portion of the set of points that are to be linguistically described;

determine a relationship between the combination of descriptors and the portion of the set of points that are to be linguistically described, the relationship drawn from an ontology;

generate the linguistic description of at least the portion of the set of points that are to be linguistically described based on the combination of descriptors and the relationship; and output geographic location specific natural language text generated based at least in part on traversing a text specification, the text specification generated based at least in part on the linguistic description of at least the portion of the set of points, wherein the geographic location specific natural language text further comprises an indication to a remote device of a specific event occurrence at a specific time.

15. An apparatus according to claim 14, wherein the at least one memory including the computer program code is further configured to, with the at least one processor, cause the apparatus to:

score each of the one or more combinations of the one or more descriptors; and select a descriptor of the one or more combinations of the one or more descriptors to linguistically describe at least the portion the set of points that are to be linguistically described, when the descriptor satisfies a predetermined single descriptor threshold score and has the highest score when compared with each of the one or more combinations of one or more other descriptors.

16. An apparatus according to claim 15, wherein the at least one memory including the computer program code is further configured to, with the at least one processor, cause the apparatus to:

select a descriptor of the one or more combinations of the one or more descriptors that has the highest score when compared with each of the one or more combinations of the one or more other descriptors when the descriptor of the one or more combinations of the one or more descriptors fails to satisfy the predetermined single descriptor threshold score and the combination of descriptors of the one or more combinations of the one or more descriptors fails to satisfy the predetermined descriptor combination threshold score;

determine a relationship between the one or more of the set of points and the descriptor; and generate the linguistic description of at least the portion of the set of points that are to be linguistically described based on the descriptor and the relationship.

17. An apparatus according to claim 14, wherein the at least one memory including the computer program code is further configured to, with the at least one processor, cause the apparatus to:

identify the spatial area that is defined by a grid; and determine one or more partitions that are to be used to linguistically describe the spatial area.

18. An apparatus according to claim 17, wherein the at least one memory including the computer program code is further configured to, with the at least one processor, cause the apparatus to:

generate the one or more combinations of the one or more descriptors based on the one or more partitions that are configured to linguistically describe at least a portion of the set of points; and align at least the portion of the set of points with each of the one or more combinations of the one or more descriptors.

19. An apparatus according to claim 17, wherein the one or more partitions are selected based on at least one of a communicative context or a domain model, wherein the domain model contains an ontology.

20. An apparatus according to claim 14, wherein one or more points that belong outside of the set of points are linguistically described.

21. An apparatus according to claim 14, wherein the text specification comprises a tree-structured text specification.

22. A computer program product for transforming raw input data expressed in a non-linguistic format into an output in a format that can be expressed linguistically, the computer program product comprising:
- at least one computer readable non-transitory memory medium having program code instructions stored thereon, the program code instructions which when executed by at least one processor cause an apparatus to at least:
- generate one or more combinations of one or more descriptors that are configured to linguistically describe at least a portion of a set of points within a spatial area;
- identify geographic location data associated with a user;
- score each of the one or more combinations of the one or more descriptors based at least in part on the geographic location data associated with the user, wherein a score for a combination of the one or more descriptors is based at least in part on a selection between one or more of a false positive measure and a false negative measure associated with the combination of the one or more descriptors, wherein the false positive measure is based on a first number of points within the set of points within the spatial area that is denoted by the combination of the one or more descriptors but is excluded from the portion of the set of points to be described, and wherein the false negative measure is based on a second number of points within the portion of the set of points to be described that are not described by the combination of the one or more descriptors;
- select the combination of descriptors of the one or more combinations of the one or more descriptors to linguistically describe at least the portion of the set of points that are to be linguistically described, when the combination of descriptors satisfies a predetermined descriptor combination threshold score and has a highest score when compared to one or more other combinations of the one or more descriptors, wherein the predetermined descriptor combination threshold score is selected based on a communicative context associated with a linguistic description of at least the portion of the set of points that are to be linguistically described;
- determine a relationship between the combination of descriptors and the portion of the set of points that are to be linguistically described, the relationship drawn from an ontology;
- generate the linguistic description of at least the portion of the set of points that are to be linguistically described based on the combination of descriptors and the relationship; and
- output geographic location specific natural language text generated based at least in part on traversing a text specification, the text specification generated based at least in part on the linguistic description of at least the portion of the set of points, wherein the geographic location specific natural language text further comprises an indication to a remote device of a specific event occurrence at a specific time.

23. A computer program product according to claim 22, further comprising program code instructions configured to, when executed by the at least one processor, cause the apparatus at least to:
- score each of the one or more combinations of the one or more descriptors; and
- select a descriptor of the one or more combinations of the one or more descriptors to linguistically describe at least the portion the set of points that are to be linguistically described, when the descriptor satisfies a predetermined single descriptor threshold score and has the highest score when compared with each of the one or more combinations of one or more other descriptors.

24. A computer program product according to claim 22, further comprising program code instructions configured to, when executed by the apparatus, cause the apparatus at least to:
- select a descriptor of the one or more combinations of the one or more descriptors that has the highest score when compared with each of the one or more combinations of the one or more other descriptors when the descriptor of the one or more combinations of the one or more descriptors fails to satisfy the predetermined single descriptor threshold score and the combination of descriptors of the one or more combinations of the one or more descriptors fails to satisfy the predetermined descriptor combination threshold score;
- determine a relationship between the one or more of the set of points and the descriptor; and
- generate the linguistic description of at least the portion of the set of points that are to be linguistically described based on the descriptor and the relationship.

25. A computer program product according to claim 22, further comprising program code instructions configured to, when executed by the apparatus, cause the apparatus at least to:
- identify the spatial area that is defined by a grid; and
- determine one or more partitions that are to be used to linguistically describe the spatial area.

26. A computer program product according to claim 25, further comprising program code instructions configured to, when executed by the apparatus, cause the apparatus at least to:
- generate the one or more combinations of the one or more descriptors based on the one or more partitions that are configured to linguistically describe at least a portion of the set of points; and
- align the at least the portion of the set of points with each of the one or more combinations of the one or more descriptors.

27. A computer program product according to claim 25, wherein the one or more partitions are selected based on at least one of a communicative context or a domain model.

28. A computer program product according to claim 22, wherein one or more points that belong outside of the set of points are linguistically described.

29. A computer program product according to claim 22, wherein text specification comprises a tree-structured text specification.

* * * * *